United States Patent [19]
Pyle

[11] Patent Number: 4,653,770
[45] Date of Patent: Mar. 31, 1987

[54] HYDRAULIC FIFTH WHEEL

[76] Inventor: Gary L. Pyle, Rte. 1, Box 195, Chico, Tex. 76030

[21] Appl. No.: 767,366

[22] Filed: Aug. 20, 1985

[51] Int. Cl.⁴ .............................................. B62D 53/08
[52] U.S. Cl. ................................... 280/432; 280/439; 280/450; 188/112 R
[58] Field of Search .............. 280/439, 440, 441, 432, 280/423 R, 486, 487, 449, 450; 188/112 R, 142

[56] References Cited
U.S. PATENT DOCUMENTS

| | | | |
|---|---|---|---|
| 2,051,522 | 8/1936 | Graham | 280/423 R |
| 3,397,899 | 8/1968 | Thompson | 280/432 |
| 3,791,674 | 2/1974 | Berends | 280/423 R |
| 3,876,239 | 4/1975 | Jackson et al. | 280/432 |
| 3,955,831 | 5/1976 | Whitchurch | 280/423 R |

Primary Examiner—John A. Pekar

[57] ABSTRACT

This invention is a tractor trailer hydraulic fifth wheel which includes a base attached to the tractor and a slidable plate attached to the trailer, and a retatchable assembly between the base and the slidable plate which includes a brak away latch therebetween.

1 Claim, 9 Drawing Figures

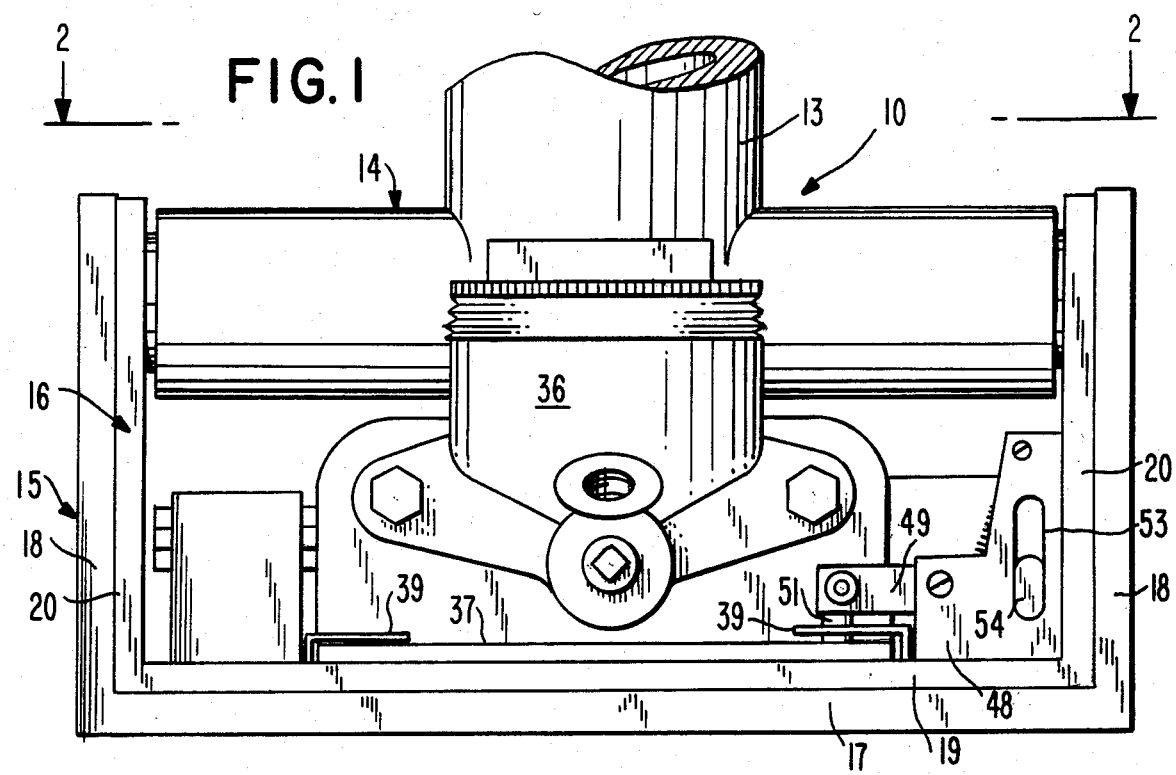
FIG. 1
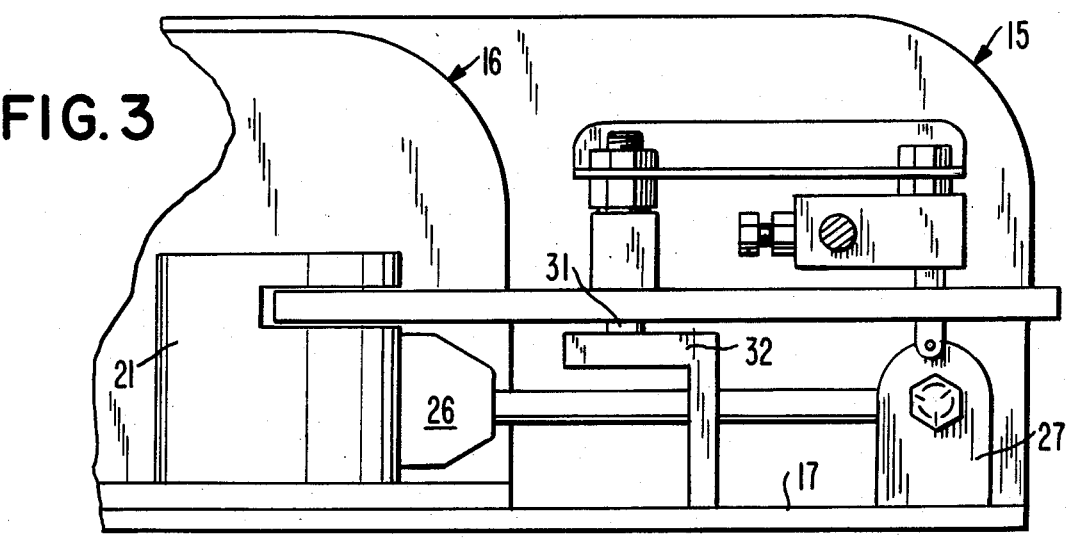
FIG. 3
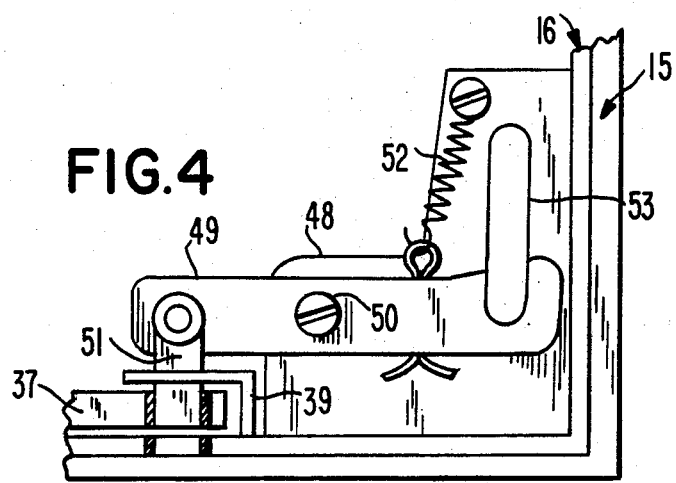
FIG. 4
FIG. 5

HYDRAULIC FIFTH WHEEL

BACKGROUND OF THE INVENTION

1 Field of the Invention

This invention relates to a fifth wheel that serves as a hitch between a towing vehicle and a towed trailer, and upon which a front end of the towed trailer is pivotally supported.

2 Description of Prior Art

It is well known to those persons acquainted with the particular field that such fifth wheels are difficult to be installed, and that there is a need for further improvement in keeping a braking load from the towing vehicle so that there is no danger of a trailer jackknifing during a braking operation.

SUMMARY OF THE INVENTION

Accordingly, it is a principal object of the present invention to provide a hydraulic fifth wheel which improvedly keeps the braking load from the towing vehicle and which is easy to install on both the trailer and the vehicle.

Another object is to provide a hydraulic fifth wheel which gives plenty of braking power on the trailer and which is easy to maintain.

Other objects are to provide a hydraulic fifth wheel, which is simple in design, inexpensive to manufacture, rugged in construction, easy to use, and efficient in operation.

These, and other objects, will be readily evident, upon a study of the following specification, and the accompanying drawing, wherein:

BRIEF DESCRIPTION OF THE DRAWINGS

FIG. 1 is a fragmentary rear elevational view of the invention;

FIG. 3 is a fragmentary side elevational view thereof and showing a latch of the device;

FIG. 4 is another fragmentary side elevational view thereof and showing a safety latch thereof;

FIG. 5 is a detail of the break away wedge;

DETAILED DESCRIPTION

Figure 2:
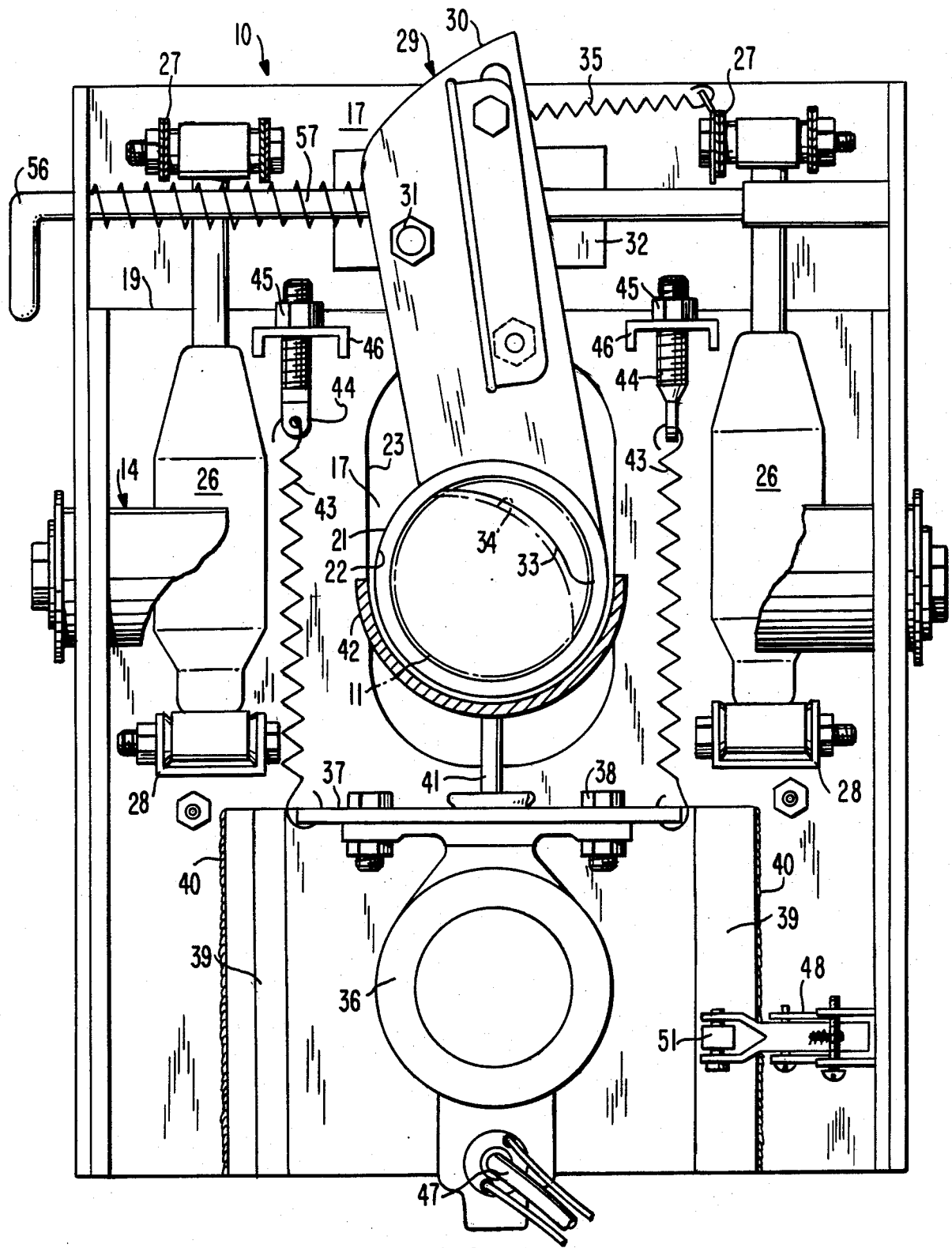
FIG. 2 is a top plan view thereof taken on line 2—2 of FIG. 1.
Figure 6:
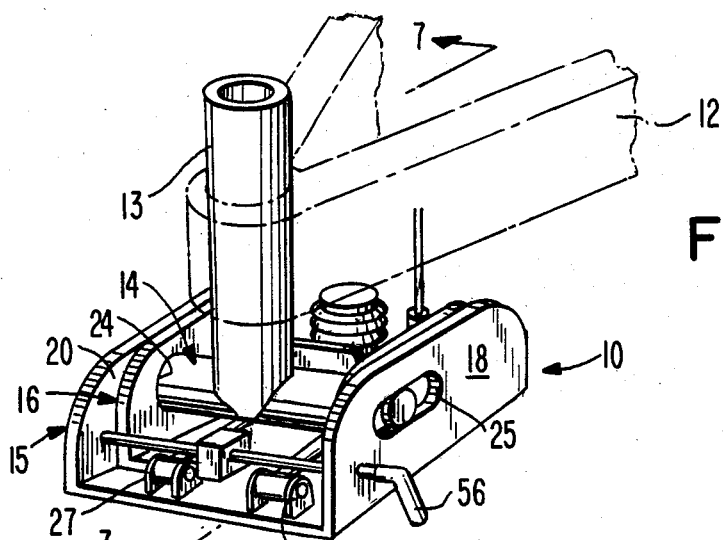
FIG. 6 is a front perspective view of the hydraulic fifth wheel shown with trailer coupled thereto.
Figure 7:
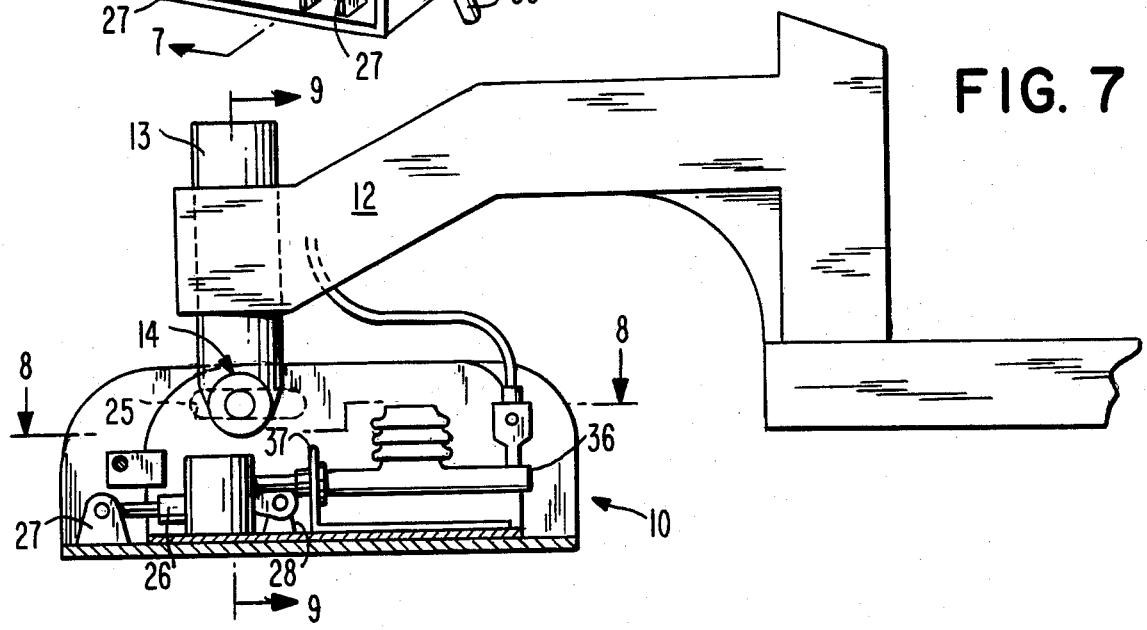
FIG. 7 is a side cross-sectional view thereof, taken on line 7—7 of FIG. 6.
Figure 8:
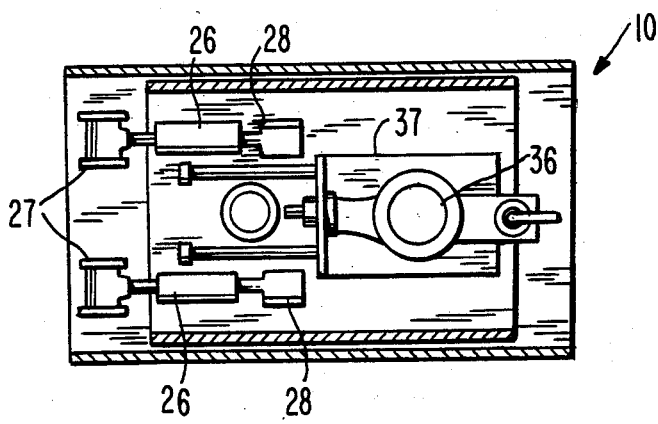
FIG. 8 is a cross-sectional plan view thereof, taken on line 8—8 of FIG. 7.
Figure 9:
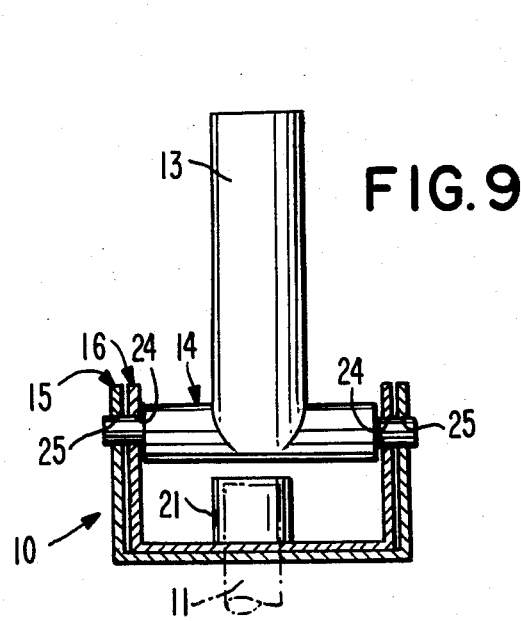
FIG. 9 is a transverse cross-sectional view, taken on line 9—9 of FIG. 7.

Referring now to the drawings in greater detail, the reference numeral 10 represents a hydraulic fifth wheel, according to the present invention and which is installed upon an upright king pin 11 of a towing vehicle; and the fifth wheel then pivotally supports a front end of a towed trailer by means of an arm 12 of the trailer being received upon an upright post 13 formed upon a wrist pin assembly 14 of the device.

The device 10 includes a channel-shaped base 15 inside which a channel-shaped slide plate 16 is slidably supported. The base has a horizontal bottom wall 17 and opposite upright side walls 18, while the slide plate has a horizontal bottom wall 19 and opposite upright side walls 20. A sleeve 21 is fixedly mounted upon the wall 17 for receiving the king pin which protrudes upwardly through a hole 22 in the bottom wall 17 and also through a slot 23 in the bottom wall 19; the sleeve also protruding upwardly through the slot 23.

Each end of the wrist pin assembly is pivotally supported in an opening 24 in each side wall 20 and also protrudes through a slot 25 in each side wall 18.

The base and the slide plate are slidably connected together by a pair of shock absorbers 26 which at one end are bolt-attached to a "U"-shaped bracket 27 mounted upon the base and which at their opposite ends are bolt-attached to a "U"-shaped bracket 28 mounted upon the slide plate.

A latch assembly 29 for latching the king pin to the sleeve 21 includes a latch plate 30 pivotable on a swivel bolt 31 mounted on a bracket 32 affixed upon base bottom wall; the latch plate having a curved end edge 33 that fits into a slot 34 made in a side of the king pin. A tension coil spring 35 attached to one of the brackets 27 pulls the latch plate pivotally into latched position.

A master cylinder 36 is mounted on a angle bracket 37 by means of bolts 38, and the angle bracket is slidable in rails 39 fastened upon the slide plate by welds 40. A horizontal ram 41, secured to the angle bracket, has a yoke 42 on its end for grasping around the sleeve. A pair of tension coil springs 43 are each attached at their one end to the angle bracket and the other end of the spring is hooked to an adjusting bolt 44 threaded in a nut 45 biased against a bracket 46 mounted upon the slide plate. The pulling force of the springs 43 urge the yoke to bear against a side of the sleeve. The master cylinder is connected to the hydraulic system of the vehicle by means of hydraulic line 47.

A slide bracket 48, affixed to the slide plate 16, pivotally supports a safety latch 49 pivoted on a pin 50 carried on the bracket 48; the latch carrying a pin 51 that locks the angle bracket 37 to the track. A tension coil spring 52 urges the pin and angle bracket in latched position. A slot 53 on the bracket 48 is provided for a break away wedge 54 retained on cable 55.

A latch handle 56 is fitted with compression coil spring 57 to urge against the latch plate 30.

The hydraulic fifth wheel operates as follows: When placed on the king pin in the bed of a truck, the king pin latch is secured when in motion, if the brakes are applied on the towing vehicle. The slide plate will slide ahead in the base, which will apply the master cylinder and the shock absorbers, will stabilize back and forth surging of the base and slide plate. When in motion, if the trailer should break away from the vehicle, the wedge in the safety latch will pull through the slot and activate the safety latch arm. This will activate the master cylinder angle bracket which in turn, causes the break away springs to pull the master cylinder angle bracket ahead and the master cylinder yoke against the king pin sleeve and activate the master cylinder to stop the trailer. To re-engage the master cylinder angle bracket, turn on an electric control valve of the hydraulic system. Once the trailer is installed again on the vehicle, back up the vehicle, which will automatically latch the break away pin in place. Then, turn off the electric valve. The purpose of the electric valve is to cut off hydraulic fluid from the trailer when backing, if leaving the trailer on a hillside or going down a long grade, cutting the fluid from the brakes, if not needed. The valve is of two-way type.

While various changes may be made in the detail construction, it is understood that such changes will be within the spirit and scope of the present invention, as is defined by the appended claims.

What I now claim is: pg,8

1. A hydraulic fifth wheel of a tractor trailer vehicle, comprising, in combination, a base for installation on a towing vehicle and a slideable plate for installation on a towed vehicle, said base and said pg,9 slideable plate each being channel-shaped, said slideable plate being slid inside said base, a sleeve mounted on said base extending upwardly through a slot of said slideable plate and receiving an upwardly king pin of said towing vehicle, a wrist pin assembly on said slideable plate including an upwardly post for connection with said towed vehicle, and a latch assembly between said slideable plate and said king pin comprising a pivotable latch plate mounted on said slideable plate engaging a slot on said king pin, a pair of shock absorbers between said base and said slideable plate, a master cylinder mounted on an angle bracket slideable on rails welded on said slideable plate, and a latch on said slideable plate to prevent said slideable plate from sliding on said base comprising a latch pin on a spring-biased arm and a wedge seated in a slot to block pivoting said arm, said wedge being tethered to a cable for being pulled by said trailer if broken away.

* * * * *